UNITED STATES PATENT OFFICE.

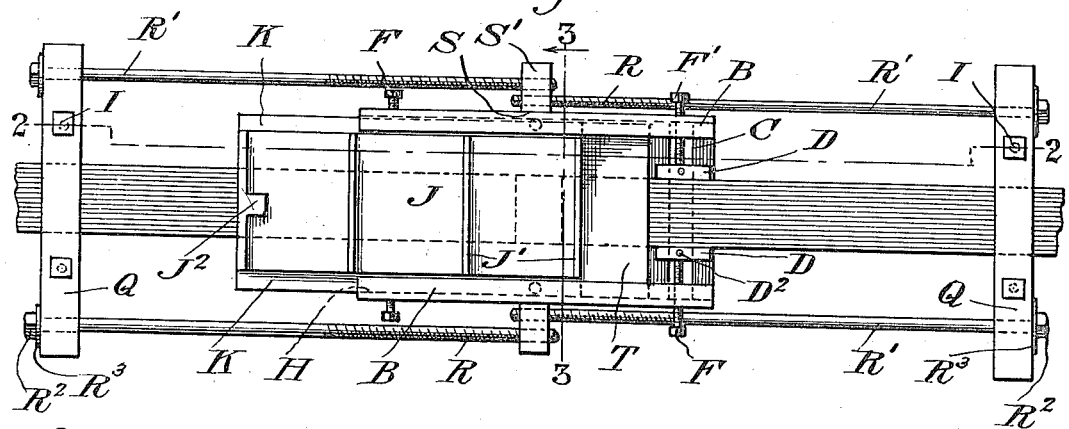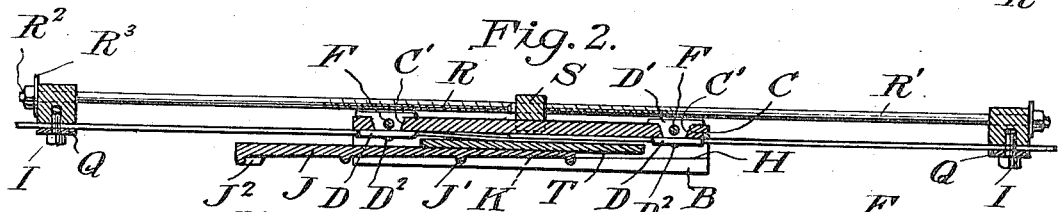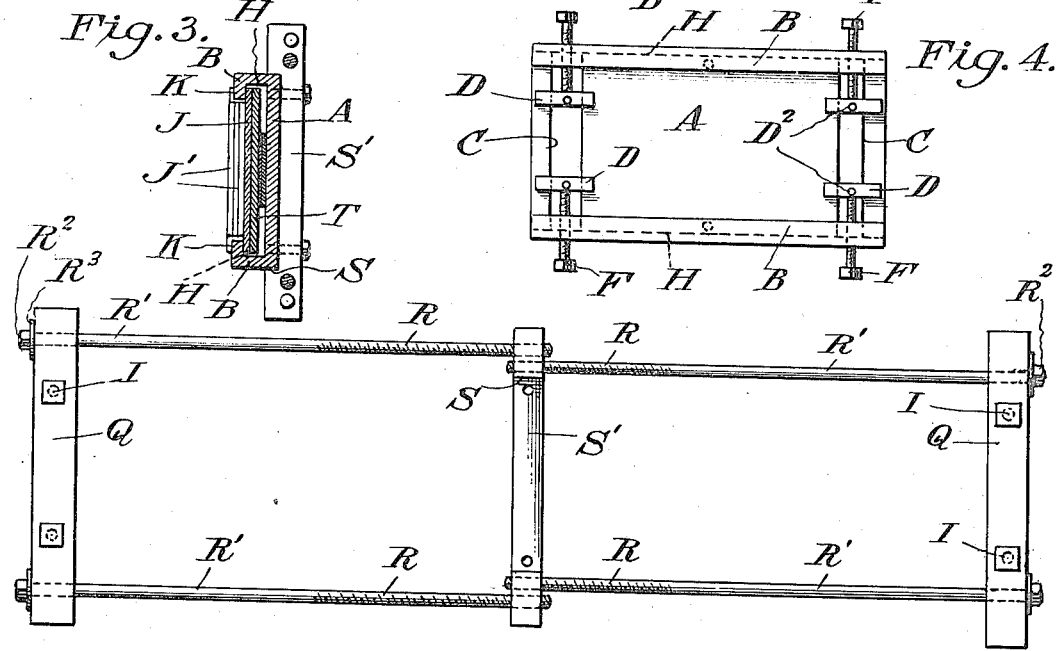

HARRY A. BLANCHARD, OF SAVANNAH, GEORGIA.

DEVICE FOR GLUING BELTS.

1,224,837.  Specification of Letters Patent.  Patented May 1, 1917.

Application filed December 23, 1916. Serial No. 138,657.

*To all whom it may concern:*

Be it known that I, HARRY A. BLANCHARD, a citizen of the United States, residing at Savannah, in the county of Chatham and State of Georgia, have invented certain new and useful Improvements in Devices for Gluing Belts; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in devices for gluing belts together and consists of a simple and efficient device of this nature so arranged that the meeting ends of the belt will be held taut and in proper alinement while being glued.

The invention comprises various details of construction, combinations and arrangements of parts, which will be hereinafter fully described, shown in the accompanying drawings and then specifically defined in the appended claims.

My invention is illustrated in the accompanying drawings, in which:—

Figure 1 is a plan view of a belt gluing device made in accordance with my invention.

Fig. 2 is a sectional view on line 2—2 of Fig. 1 and inverted relative to Fig. 1.

Fig. 3 is a cross section on line 3—3 of Fig. 1.

Fig. 4 is a detail view.

Fig. 5 is a detail view of the frame.

Reference now being had to the details of the drawings by letter, A designates a frame having two flanges B upon the opposite longitudinal sides thereof, said frame having openings C therein, the lower marginal walls of which are cut away as at C'. Movable clamping members, made up of two parts, D and D', held together by means of a screw D² have shank portions movable within said slots, said clamping members being adapted to engage the opposite edges of a belt to hold the edges of the belts in alinement. A screw F is mounted in threaded openings in the flanges of the frame and their inner ends engage said clamping members, affording means whereby, as the screws are turned, the clamping members may be moved toward or away from each other.

The inner walls of said flanges are provided with longitudinal diagonal channels H adapted to receive the longitudinally movable clamping members J, the opposite edges K of which are wedge-shaped, thereby affording means whereby, as the member J is moved in one direction, it may have a clamping relation with the upper faces of the meeting ends of a belt to be glued together. Said member J has ribs J' upon the surface thereof and an integral lug J², forming convenient means whereby the member may be moved into or out of clamping relation with a board T which is adapted to be placed against the outer faces of the meeting edges of the belt and intermediate the same and said member.

Upon reference to Fig. 1, it will be noted that said frame is seated in a recess S formed in the bar S', which latter has threaded apertures for the reception of the threaded ends R of the rods R'. Clamping members Q are arranged in pairs as shown and adapted to be held in clamping relation with the meeting ends of a belt by means of the screws I and each of said rods R' passes between the clamping members Q and has a head R², suitable washers R³ being mounted upon the rods intermediate the outer edges of the clamping members Q and said head.

In operation, the ends of the belts to be glued together are placed between the clamping members Q and the screws F turned so as to bring the opposite edges of the belts in alinement with each other, after which the screws I are tightened to draw the clamping members Q frictionally against the opposite faces of the inclined portions of the belts. By turning the screws R' through the medium of the heads R², the belt may be stretched so that the ends will overlap before being glued together. The ends of the belt will rest, while being glued, on the bottom of the frame A, and, after the adhesive material has been applied to the material to be glued together, the board T is placed over the glued portion and the clamping member J forced longitudinally in the inclined channels in the flanges, thus holding the overlapping ends of the belt until they are thoroughly glued together.

What I claim to be new is:—

1. A device for gluing belts comprising a frame having flanged sides which are provided with inclined channels, said frame having transverse openings therein, movable clamping members in said openings adapted to engage and aline the opposite edges of the belt, a longitudinally movable clamping member having wedge-shaped edges movable in said channels, and a board interposed between the clamping member and the frame.

2. In combination with a frame having flanged sides which are longitudinally channeled, said frame having transverse openings, clamping members having shank portions with dove-tail connections with said openings, screws mounted in the flanges of the frame and engaging said clamping members, a longitudinally movable clamping member having wedge-shaped edges and transverse ribs, and a board interposed between the clamping member and frame.

In testimony whereof I hereunto affix my signature in presence of two witnesses.

HARRY A. BLANCHARD.

Witnesses:
A. P. WARD,
L. L. BROUGHTON.